(12) United States Patent
Kang et al.

(10) Patent No.: US 9,479,728 B2
(45) Date of Patent: Oct. 25, 2016

(54) VIDEO SMS MESSAGE SENDING AND RECEIVING METHODS AND APPARATUSES THEREOF, AND HANDHELD ELECTRONIC DEVICE

(71) Applicant: Huawei Technologies Co., Ltd., Shenzhen (CN)

(72) Inventors: Zhi Kang, Hangzhou (CN); Rongliang Liu, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/811,308

(22) Filed: Jul. 28, 2015

(65) Prior Publication Data

US 2015/0334347 A1    Nov. 19, 2015

Related U.S. Application Data

(63) Continuation of application No. PCT/CN2014/070922, filed on Jan. 20, 2014.

(30) Foreign Application Priority Data

Jan. 29, 2013  (CN) .......................... 2013 1 0033292

(51) Int. Cl.
H04N 7/14        (2006.01)
H04W 4/14       (2009.01)
H04L 12/58       (2006.01)

(52) U.S. Cl.
CPC ............. H04N 7/147 (2013.01); H04L 51/10 (2013.01); H04L 51/38 (2013.01); H04W 4/14 (2013.01)

(58) Field of Classification Search
USPC ......... 348/14.01, 14.02, 14.03, 14.1, 211.12, 348/429.1, 432.1, 516, 522, 423.1
See application file for complete search history.

(56) References Cited

U.S. PATENT DOCUMENTS

2010/0223314 A1* 9/2010 Gadel ................. G11B 27/034
709/200
2012/0036132 A1    2/2012 Doyle
(Continued)

FOREIGN PATENT DOCUMENTS

CN    101207759 A    6/2008
CN    102387094 A    3/2012
(Continued)

OTHER PUBLICATIONS

Chang, C., et al., "Evolving Virtual Contents with Interactions in Videos," Proceedings of the 1st International Workshop on Interactive Mulitmedia for Consumer Electrons, Oct. 23, 2009 pp. 97-104.

Primary Examiner — Yosef K Laekemariam
(74) Attorney, Agent, or Firm — Slater Matsil, LLP

(57) ABSTRACT

Embodiments of the present invention provide video SMS message sending and receiving methods and apparatuses thereof, and a handheld electronic device. The video SMS message sending method of the present invention includes: acquiring audio/video content, synchronously acquiring graffiti input corresponding to the audio/video content, and combining the audio/video content and the graffiti input into a graffiti video file; sending the graffiti video file as a video SMS message to an SMS message receiver. According to the embodiments of the present invention, a key point in a video SMS message can be emphasized, optimizing a video SMS message display effect.

21 Claims, 8 Drawing Sheets

(56) References Cited

U.S. PATENT DOCUMENTS

2012/0167001 A1 6/2012 Ortiz et al.
2013/0010051 A1* 1/2013 Shlaimoun .............. H04W 4/14
348/14.02

FOREIGN PATENT DOCUMENTS

| EP | 1679876 A1 | 7/2006 |
| WO | 2014130559 A1 | 8/2014 |

* cited by examiner

VIDEO SMS MESSAGE SENDING AND RECEIVING METHODS AND APPARATUSES THEREOF, AND HANDHELD ELECTRONIC DEVICE

This application is a continuation of International Application No. PCT/CN2014/070922, filed on Jan. 20, 2014, which claims priority to Chinese Patent Application No. 201310033292.4, filed on Jan. 29, 2013, both of which are hereby incorporated by reference in their entireties.

TECHNICAL FIELD

Embodiments of the present invention relate to communications technologies, and in particular, to video SMS message sending and receiving methods and apparatuses thereof, and a handheld electronic device.

BACKGROUND

With development of computer technologies and communications technologies, and in particular, in an era when smartphones develop rapidly, a requirement of a user for a mobile phone is no longer simply a call function and an SMS message function; instead, it is expected that a mobile phone can provide more various multimedia application services. In addition, an operator also expects to earn more profits by using a multimedia value-added service. Therefore, emergence of a multimedia message, a picture SMS message, and a video SMS message just meets a market demand.

FIG. 1 is a schematic diagram of an implementation solution of a video technology in the prior art, where the solution is a currently popular one-to-one video SMS message implementation solution. As shown in FIG. 1, for party A, mobile phone A collects an audio/video by using two audio/video collecting devices: a camera and a microphone that are on the mobile phone, compresses the audio/video after collecting is complete to reduce transmission traffic, and then sends a compressed audio/video to public network signaling and a data server. The data server first finds that a destination of the video SMS message is party B, and that party B is online, and then sends the video SMS message to party B. After completing receiving the video SMS message, party B first decompresses, then decodes, and plays the received video SMS message.

In the foregoing technology, collected content of a video needs to be elaborated by a sender by adding speech or text; a recipient needs to listen to sound in the video to determine a key point that a user intends to share, so that a highlight in the video cannot be emphasized.

SUMMARY

Embodiments of the present invention provide video SMS message sending and receiving methods and apparatuses thereof, and a handheld electronic device, to emphasize a key point in a video SMS message, thereby optimizing a video SMS message display effect.

According to a first aspect, an embodiment of the present invention provides a video SMS message sending method, including acquiring audio/video content, synchronously acquiring graffiti input corresponding to the audio/video content, and combining the audio/video content and the graffiti input into a graffiti video file; and sending the graffiti video file as a video SMS message to an SMS message receiver.

In a first possible implementation manner of the first aspect, the acquiring audio/video content, synchronously acquiring graffiti input corresponding to the audio/video content, and combining the audio/video content and the graffiti input into a graffiti video file includes: acquiring the audio/video content to form an audio/video file, and synchronously acquiring the graffiti input corresponding to the audio/video content to form a graffiti file; and separately storing the audio/video file and the graffiti file in the graffiti video file, and recording respective starting locations of the audio/video file and the graffiti file.

According to the first possible implementation manner of the first aspect, in a second possible implementation manner, the acquiring the audio/video content to form an audio/video file, and synchronously acquiring the graffiti input corresponding to the audio/video content to form a graffiti file includes: acquiring audio/video content of a current frame, and recording the audio/video content in the audio/video file. While acquiring the audio/video content of the current frame, collecting, at a transparent background layer, at least one type of graffiti input, combining the at least one type of graffiti input into a graffiti picture of the current frame, recording the graffiti picture of the current frame in the graffiti file, and recording attribute information of the graffiti picture of the current frame in a graffiti information maintenance table; and repeatedly executing the foregoing steps to process each frame, until it is determined that recording of the audio/video content ends.

According to the second possible implementation manner of the first aspect, in a third possible implementation manner, the attribute information of the graffiti picture of the current frame includes at least: a size of the graffiti picture of the current frame, a time point and an encoding format that are of the current frame, and duration of the current frame.

According to the first possible implementation manner of the first aspect, in a fourth possible implementation manner, the acquiring the audio/video content to form an audio/video file, and synchronously acquiring the graffiti input corresponding to the audio/video content to form a graffiti file includes: acquiring audio/video content of a current frame, and recording the audio/video content in the audio/video file. While acquiring the audio/video content of the current frame, collecting, at a transparent background layer, at least one type of graffiti input, separately recording the at least one type of graffiti input in the graffiti file, and separately recording attribute information of the at least one type of graffiti input in a graffiti information maintenance table. The method further includes repeatedly executing the foregoing steps to process each frame, until it is determined that recording of the audio/video content ends.

In a fifth possible implementation manner of the first aspect, the acquiring audio/video content, synchronously acquiring graffiti input corresponding to the audio/video content, and combining the audio/video content and the graffiti input into a graffiti video file includes: acquiring audio/video content of a current frame, and storing the audio/video content in an audio/video frame cache. While acquiring the audio/video content of the current frame, the method includes collecting, at a transparent background layer, at least one type of graffiti input, and separately storing the at least one type of graffiti input in the at least one type of graffiti frame cache. The method further includes combining data that is in the audio/video frame cache and the at least one type of graffiti frame cache and that is of the current frame, and storing combined data in a combined-frame cache. The method further includes encoding data that is in the combined-frame cache to form an audio/video of the current frame, and recording the audio/video in the graffiti video file; and repeatedly executing the foregoing steps to process each frame, until it is determined that recording of the audio/video content ends.

According to any one of the second to the fifth possible implementation manners of the first aspect, in a sixth possible implementation manner, the at least one type of graffiti input includes at least: touch track input and an additional picture.

According to the sixth possible implementation manner of the first aspect, in a seventh possible implementation manner, attribute information of the touch track input includes: a coordinate, a line width, color, a time point, and duration that are of a touch track.

According to a second aspect, an embodiment of the present invention provides a video SMS message receiving method, including: receiving a video SMS message sent by an SMS message sender; and acquiring, by parsing, audio/video content and graffiti input from the video SMS message, and superimposing the graffiti input on the audio/video content to perform playing.

In a first possible implementation manner of the second aspect, the acquiring, by parsing, audio/video content and graffiti input from the video SMS message, and superimposing the graffiti input on the audio/video content to perform playing includes: separately acquiring, at respective starting locations that are of an audio/video file and a graffiti file and indicated in a graffiti video file of the video SMS message, the audio/video file and the graffiti file by parsing; acquiring, by splitting, an audio layer and a video layer from the audio/video file; acquiring a graffiti layer from the graffiti file; synchronizing the graffiti layer with the audio layer and the video layer in terms of frame time according to attribute information, of a graffiti picture, recorded in a graffiti information maintenance table in the graffiti file. The method further includes playing the audio layer by using an audio channel, playing the video layer by using a second layer of a video channel, playing the graffiti layer by using a first layer of the video channel, where the first layer is superimposed on the second layer.

In a second possible implementation manner of the second aspect, the acquiring, by parsing, audio/video content and graffiti input from the video SMS message, and superimposing the graffiti input on the audio/video content to perform playing includes separately acquiring, at respective starting locations that are of an audio/video file and a graffiti file and indicated in a graffiti video file of the video SMS message, the audio/video file and the graffiti file by parsing. The method further includes acquiring, by splitting, an audio layer and a video layer from the audio/video file; acquiring a graffiti layer from the graffiti file; synchronizing the at least one type of graffiti input that is at the graffiti layer with the audio layer and the video layer in terms of frame time according to attribute information, of the at least one type of graffiti input, recorded in a graffiti information maintenance table in the graffiti file. The method further includes playing the audio layer by using an audio channel, playing the video layer by using a second layer of a video channel, playing the at least one type of graffiti input that is at the graffiti layer by using a first layer of the video channel separately, where the first layer is superimposed on the second layer.

According to the second possible implementation manner of the second aspect, in a third possible implementation manner, the at least one type of graffiti input includes at least: touch track input and an additional picture.

According to a third aspect, an embodiment of the present invention provides a video SMS message sending apparatus, including an acquiring and combining module configured to acquire audio/video content, synchronously acquire graffiti input corresponding to the audio/video content, and combine the audio/video content and the graffiti input into a graffiti video file; and a sending module configured to send the graffiti video file as a video SMS message to an SMS message receiver.

In a first possible implementation manner of the third aspect, the acquiring and combining module includes a file acquiring unit, configured to acquire the audio/video content to form an audio/video file, and synchronously acquire the graffiti input corresponding to the audio/video content to form a graffiti file; and a file combining unit, configured to separately store the audio/video file and the graffiti file in the graffiti video file, and record respective starting locations of the audio/video file and the graffiti file.

According to the first possible implementation manner of the third aspect, in a second possible implementation manner, the file acquiring unit includes an audio/video file acquiring subunit, configured to acquire audio/video content of a current frame, and record the audio/video content in the audio/video file. A first graffiti file acquiring subunit is configured to: while the audio/video content of the current frame is being acquired, collect, at a transparent background layer, at least one type of graffiti input, combine the at least one type of graffiti input into a graffiti picture of the current frame, record the graffiti picture of the current frame in the graffiti file, and record attribute information of the graffiti picture of the current frame in a graffiti information maintenance table. Operations of the audio/video file acquiring subunit and the first graffiti file acquiring subunit are repeatedly executed to process each frame, until it is determined that recording of the audio/video content ends.

According to the second possible implementation manner of the third aspect, in a third possible implementation manner, the attribute information of the graffiti picture of the current frame includes at least: a size of the graffiti picture of the current frame, a time point and an encoding format that are of the current frame, and duration of the current frame.

According to the first possible implementation manner of the third aspect, in a fourth possible implementation manner, the file acquiring unit includes an audio/video file acquiring subunit configured to acquire audio/video content of a current frame, and record the audio/video content in the audio/video file. A second graffiti file acquiring subunit is configured to: while the audio/video content of the current frame is being acquired, collect, at a transparent background layer, at least one type of graffiti input, separately record the at least one type of graffiti input in the graffiti file, and separately record attribute information of the at least one type of graffiti input in a graffiti information maintenance table. Operations of the audio/video file acquiring subunit and the second graffiti file acquiring subunit are repeatedly executed to process each frame, until it is determined that recording of the audio/video content ends.

In a fifth possible implementation manner of the third aspect, the acquiring and combining module includes an audio/video cache unit configured to acquire audio/video content of a current frame, and store the audio/video content in an audio/video frame cache. A graffiti cache unit is configured to: while the audio/video content of the current frame is being acquired, collect, at a transparent background layer, at least one type of graffiti input, and separately store the at least one type of graffiti input in the at least one type of graffiti frame cache. A cache combining unit is configured to combine data that is in the audio/video frame cache and the at least one type of graffiti frame cache and that is of the current frame, and store combined data in a combined-frame cache. A cache encoding unit is configured to encode data that is in the combined-frame cache to form an audio/video of the current frame, and record the audio/video in the graffiti video file. Operations of the audio/video cache unit, the graffiti cache unit, the cache combining unit, and the cache encoding unit are repeatedly executed to process each frame, until it is determined that recording of the audio/video content ends.

According to any one of the second to the fifth possible implementation manners of the third aspect, in a sixth possible implementation manner, the at least one type of graffiti input includes at least: touch track input and an additional picture.

According to the sixth possible implementation manner of the third aspect, in a seventh possible implementation manner, attribute information of the touch track input includes: a coordinate, a line width, color, a time point, and duration that are of a touch track.

According to a fourth aspect, an embodiment of the present invention provides a video SMS message receiving apparatus, including a receiving module configured to receive a video SMS message sent by an SMS message sender. A parsing and playing module configured to acquire, by parsing, audio/video content and graffiti input from the video SMS message, and superimpose the graffiti input on the audio/video content to perform playing.

In a first possible implementation manner of the fourth aspect, the parsing and playing module includes a file parsing unit configured to separately acquire, at respective starting locations that are of an audio/video file and a graffiti file and indicated in a graffiti video file of the video SMS message, the audio/video file and the graffiti file by parsing. An audio/video splitting unit is configured to acquire, by splitting, an audio layer and a video layer from the audio/video file. A graffiti splitting unit is configured to acquire a graffiti layer from the graffiti file. A first time synchronization unit is configured to synchronize the graffiti layer with the audio layer and the video layer in terms of frame time according to attribute information, of a graffiti picture, recorded in a graffiti information maintenance table in the graffiti file. A first playing unit is configured to play the audio layer by using an audio channel, play the video layer by using a second layer of a video channel, and play the graffiti layer by using a first layer of the video channel, where the first layer is superimposed on the second layer.

In a second possible implementation manner of the fourth aspect, the parsing and playing module includes a file parsing unit configured to separately acquire, at respective starting locations that are of an audio/video file and a graffiti file and indicated in a graffiti video file of the video SMS message, the audio/video file and the graffiti file by parsing. A n audio/video splitting unit is configured to acquire, by splitting, an audio layer and a video layer from the audio/video file. A graffiti splitting unit is configured to acquire a graffiti layer from the graffiti file. A second time synchronization unit is configured to synchronize the at least one type of graffiti input that is at the graffiti layer with the audio layer and the video layer in terms of frame time according to attribute information, of the at least one type of graffiti input, recorded in a graffiti information maintenance table in the graffiti file. A second playing unit is configured to play the audio layer by using an audio channel, play the video layer by using a second layer of a video channel, and play the at least one type of graffiti input that is at the graffiti layer by using a first layer of the video channel separately, where the first layer is superimposed on the second layer.

According to the second possible implementation manner of the fourth aspect, in a third possible implementation manner, the at least one type of graffiti input includes at least: touch track input and an additional picture.

According to a fifth aspect, an embodiment of the present invention provides a handheld electronic device including a memory, and further including the video SMS message sending apparatus according to any embodiment of the present invention and the video SMS message receiving apparatus according to any embodiment of the present invention. The handheld electronic device further includes a camera configured to collect video content; a microphone, configured to collect audio content; a touchscreen, configured to receive an input operation of a user; an audio channel, configured to play the audio content; and a video channel, configured to play the video content and graffiti input.

According to video SMS message sending and receiving methods and apparatuses thereof, and a handheld electronic device that are provided by embodiments of the present invention, a highlight in a video is indicated by graffiti in a video SMS message shooting process, to emphasize a key point that is in the video SMS message, thereby optimizing a video SMS message display effect.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly and describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Embodiment 1

Figure 1:
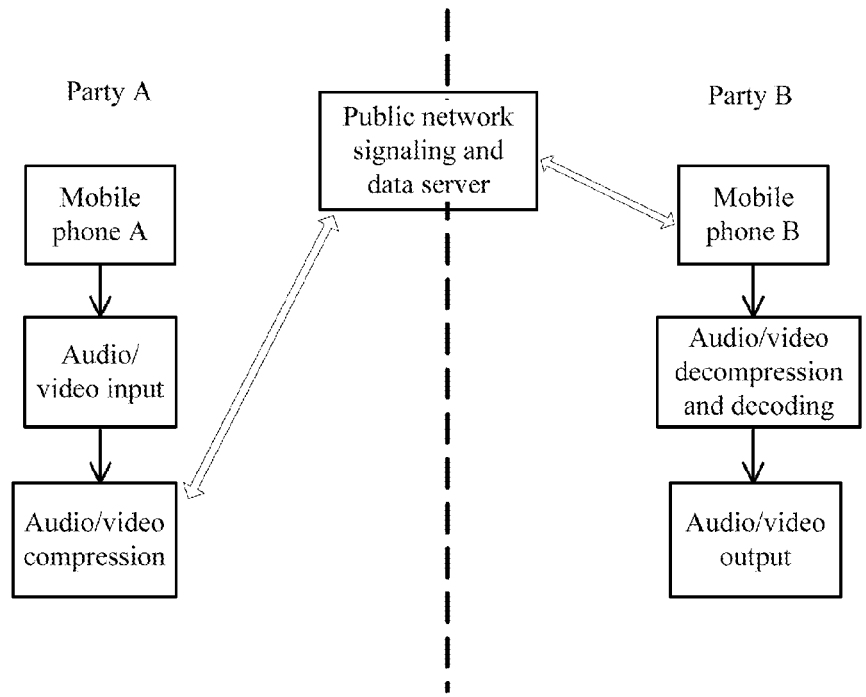
FIG. 1 is a schematic diagram of an implementation solution of a video SMS message in the prior art.
Figure 2:
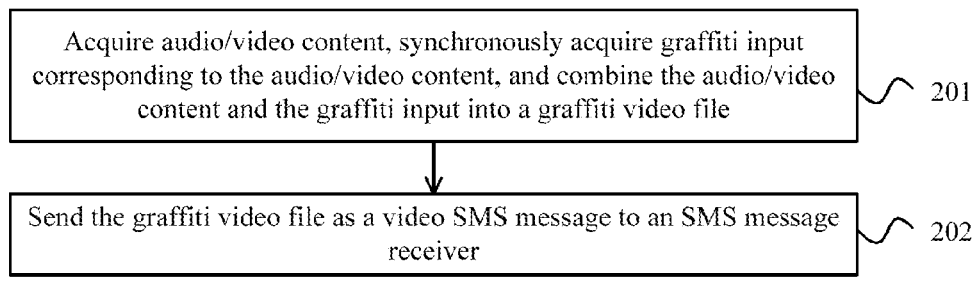
FIG. 2 is a flowchart of a video SMS message sending method according to Embodiment 1 of the present invention.

FIG. 2 is a flowchart of a video SMS message sending method according to Embodiment 1 of the present invention. The embodiment may be applied to a video SMS message where a handheld electronic device edits and adds graffiti input, to emphasize a highlight that is in a video and that a user intends to share. The method may be executed by a video SMS message sending apparatus. The apparatus may be implemented in a form of hardware and/or software, and may be integrated in a handheld electronic device. The handheld electronic device may be any terminal device such as a mobile phone and a tablet computer. The method specifically includes the following steps.

Step 201: Acquire audio/video content, synchronously acquire graffiti input corresponding to the audio/video content, and combine the audio/video content and the graffiti input into a graffiti video file.

Specifically, the audio/video content may be audio/video content collected by using two audio/video collecting devices: a camera and a microphone that are in the handheld electronic device. The graffiti input may be touch track input and/or additional picture information that are/is collected by using a touchscreen of the handheld electronic device. Combining in the step only needs to simply join, end to end, a video file formed by the audio/video content and a graffiti file formed by the graffiti input, and add a file header to the graffiti video file to record locations of the two files after superimposition, so as to facilitate separation of the two files when file parsing is performed.

Step 202: Send the graffiti video file as a video SMS message to an SMS message receiver.

Specifically, the SMS message receiver is just relative to an SMS message sender, both of which are equal. In a communication process, the SMS message receiver and the SMS message sender may simultaneously send a video SMS message, or either one may send a video SMS message.

In the embodiment, in a video SMS message acquiring process, a highlight in a video is indicated by using graffiti input, so that a large quantity of words used to express content of a video SMS message in the prior art are changed into a graffiti manner, optimizing a video SMS message display effect, and also improving user experience and increasing fun of video shooting.

Based on the foregoing embodiment, the operation of acquiring audio/video content, synchronously acquiring graffiti input corresponding to the audio/video content, and combining the audio/video content and the graffiti input into a graffiti video file may be specifically: acquiring the audio/video content to form an audio/video file, and synchronously acquiring the graffiti input corresponding to the audio/video content to form a graffiti file; separately storing the audio/video file and the graffiti file in the graffiti video file, and recording respective starting locations of the audio/video file and the graffiti file. According to the technical solution, an independent audio/video file and an independent graffiti file may be separately formed, and separately recorded for a receiver to perform acquiring by parsing, so that a user can perform an operation only on the graffiti file or the audio/video file, for example, after recording is complete, the user may further modify the graffiti file.

Embodiment 2

Figure 3:
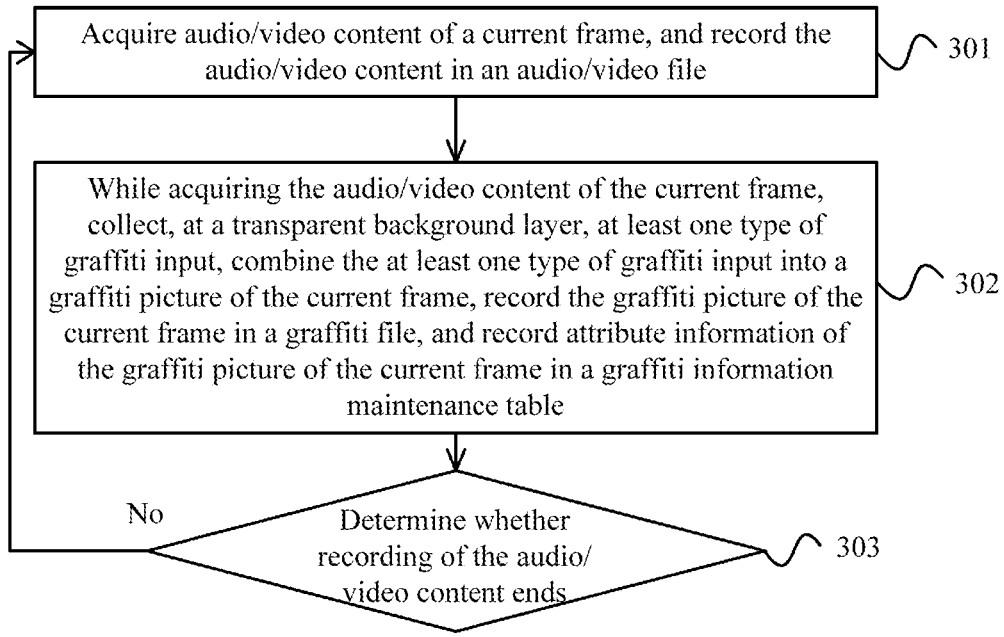
FIG. 3 is a flowchart of a video SMS message sending method according to Embodiment 2 of the present invention.

FIG. 3 is a flowchart of a video SMS message sending method according to Embodiment 2 of the present invention. Based on the foregoing embodiment, the embodiment further optimizes the operation of acquiring the audio/video content to form an audio/video file, and synchronously acquiring the graffiti input corresponding to the audio/video content to form a graffiti file. As shown in FIG. 3, the operation of acquiring the audio/video content to form an audio/video file, and synchronously acquiring the graffiti input corresponding to the audio/video content to form a graffiti file may specifically include the following steps.

Step 301: Acquire audio/video content of a current frame, and record the audio/video content in the audio/video file.

Step 302: While acquiring the audio/video content of the current frame, collect, at a transparent background layer, at least one type of graffiti input, combine the at least one type of graffiti input into a graffiti picture of the current frame, record the graffiti picture of the current frame in the graffiti file, and record attribute information of the graffiti picture of the current frame in a graffiti information maintenance table.

The attribute information of the graffiti picture of the current frame includes at least: a size of the graffiti picture of the current frame, a time point and an encoding format that are of the current frame, and duration of the current frame. The attribute information is recorded, so that the graffiti picture may be restored by acquiring the attribute information by parsing at a receiver. The at least one type of graffiti input may include at least: touch track input and an additional picture, and for example, may further include a transparent background picture.

Step 303: Repeatedly execute step 301 and step 302 to process each frame, until it is determined that recording of the audio/video content ends.

The foregoing step 301 and step 302 are processing on each frame. A processing operation on each frame is the same and is repeatedly executed, and each frame is recorded in a file one by one, until the recording ends.

In the embodiment of the present invention, a graffiti picture of each frame is synchronously formed, so as to reduce subsequent processing time, for example, time of parsing and synchronizing after a receiver receives a video SMS message is reduced; attribute information of a graffiti picture of a current frame is recorded in a graffiti information maintenance table of a graffiti file, so as to facilitate parsing when playing is performed, and when the graffiti picture of the current frame is changed, the graffiti information maintenance table may be updated in a timely manner, for example, when an operation, such as erasing touch track input or deleting an additional picture, is performed, modification information is updated in real time in a part that is corresponding to the current frame and that is in the graffiti information maintenance table, so that a user can perform an operation only on the graffiti file or an audio/video file.

Embodiment 3

Figure 4:
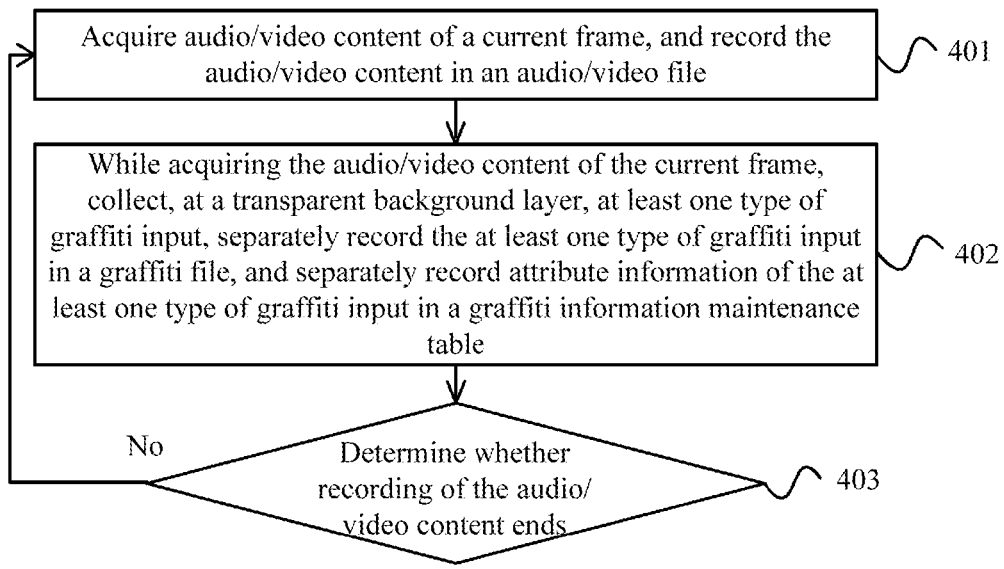
FIG. 4 is a flowchart of a video SMS message sending method according to Embodiment 3 of the present invention.

Based on the foregoing descriptions, as shown in FIG. 4, another implementation manner of acquiring the audio/video content to form an audio/video file, and synchronously acquiring the graffiti input corresponding to the audio/video content to form a graffiti file as described below.

Step 401: Acquire audio/video content of a current frame, and record the audio/video content in the audio/video file.

Step 402: While acquiring the audio/video content of the current frame, collect, at a transparent background layer, at least one type of graffiti input, separately record the at least one type of graffiti input in the graffiti file, and separately record attribute information of the at least one type of graffiti input in a graffiti information maintenance table.

The at least one type of graffiti input includes at least: touch track input and an additional picture. Attribute information of the touch track input includes: a coordinate, a line width, color, a time point, and duration that are of a touch track. The attribute information is recorded, so that the at least one type of graffiti input may be restored by acquiring the attribute information by parsing at a receiver.

Step 403: Repeatedly execute step 401 and step 402 to process each frame, until it is determined that recording of the audio/video content ends.

The foregoing step 401 and step 402 are processing on each frame. A processing operation on each frame is the same and is repeatedly executed, and each frame is recorded in a file one by one, until the recording of the audio/video content ends.

A difference between the embodiment of the present invention and the foregoing Embodiment 2 lies in that: in the embodiment of the present invention, the at least one type of graffiti input is not combined into a graffiti picture of a current frame; instead, the at least one type of graffiti input is separately recorded in a graffiti file, and attribute information of the at least one type of graffiti input is separately recorded in a graffiti information maintenance table, so that when only one type of graffiti input needs to be changed, only attribute information corresponding to the type of graffiti input is updated, thereby improving efficiency. For example, when touch track input needs to be erased or attribute information of the touch track input such as a line width and color needs to be changed, only the attribute information that is of the touch track input and that is in the graffiti information maintenance table is updated; when an additional picture needs to be deleted or added, only attribute information that is of the additional picture and that is in the graffiti information maintenance table is updated, so that a user can conveniently perform an operation only on one type of graffiti input.

Embodiment 4

Figure 5:
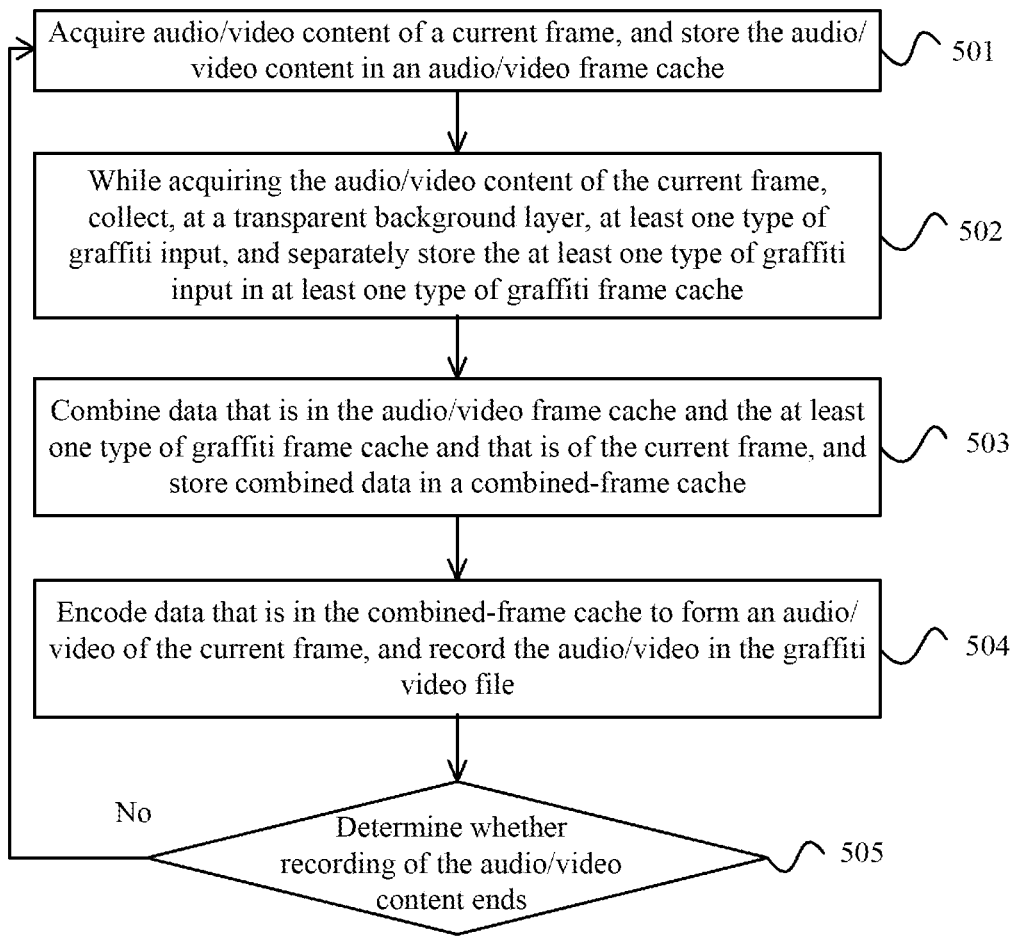
FIG. 5 is a flowchart of a video SMS message sending method according to Embodiment 4 of the present invention.

FIG. 5 is a flowchart of a video SMS message sending method according to Embodiment 4 of the present invention. Based on the foregoing embodiment, the embodiment further optimizes the operation of acquiring audio/video content, synchronously acquiring graffiti input corresponding to the audio/video content, and combining the audio/video content and the graffiti input into a graffiti video file. As shown in FIG. 5, the acquiring audio/video content, synchronously acquiring graffiti input corresponding to the audio/video content, and combining the audio/video content and the graffiti input into a graffiti video file may specifically include the following steps.

Step 501: Acquire audio/video content of a current frame, and store the audio/video content in an audio/video frame cache.

Specifically, the audio/video content may be collected by using a camera and a microphone. During echoing of a video, audio/video data may be stored in the audio/video frame cache, and the audio/video frame cache is a hardware resource and exists in all mobile terminal devices.

Step 502: While acquiring the audio/video content of the current frame, collect, at a transparent background layer, at least one type of graffiti input, and separately store the at least one type of graffiti input in the at least one type of graffiti frame cache.

Specifically, the at least one type of graffiti input includes at least: touch track input and an additional picture, and for example, further includes a transparent background picture. During echoing of the at least one type of graffiti input, graffiti data is stored in the at least one type of graffiti frame cache. For example, during echoing of the touch track input, graphic data formed by touching is stored in a touch display frame cache, while the additional picture and the like are stored in a user interface display frame cache.

Step 503: Combine data that is in the audio/video frame cache and the at least one type of graffiti frame cache and that is of the current frame, and store combined data in a combined-frame cache.

Specifically, layer data that is in the audio/video frame cache and of the current frame and layer data that is in the at least one type of graffiti frame cache and of the current frame are combined into data of a main layer by using a layer (or an audio) mixer. Data after combination is final data sent to a display device. For example, data of each layer is in an ARGB32 format. Because a main layer is displayed finally, and the main layer is formed by combining multiple layers, a manner of the combining specifically refers to that a piece of corresponding control data describes data of a layer corresponding to each area, and that a mixer performs AND/OR combination on the data of each layer according to the information.

Step 504: Encode data that is in the combined-frame cache to form an audio/video of the current frame, and record the audio/video in the graffiti video file.

Specifically, the encoding uses a compression coding standard to reduce transmission traffic, for example, an H.264/MPEG4 standard is used.

Step 505: Repeatedly execute step 501 to step 504 to process each frame, until it is determined that recording of the audio/video content ends.

The foregoing step 501 to step 504 are processing on each frame. A processing operation on each frame is the same and is repeatedly executed, and each frame is recorded in the graffiti video file one by one, until the recording of the audio/video content ends.

According to the embodiment of the present invention, audio/video content of a current frame and the at least one type of graffiti input of the current frame are combined by using a hardware mixer, and when playing and parsing are performed, there is no need to separately parse and process the audio/video content and the graffiti input, thereby reducing parsing time of a receiver, and improving playing efficiency.

Embodiment 5

Figure 6:
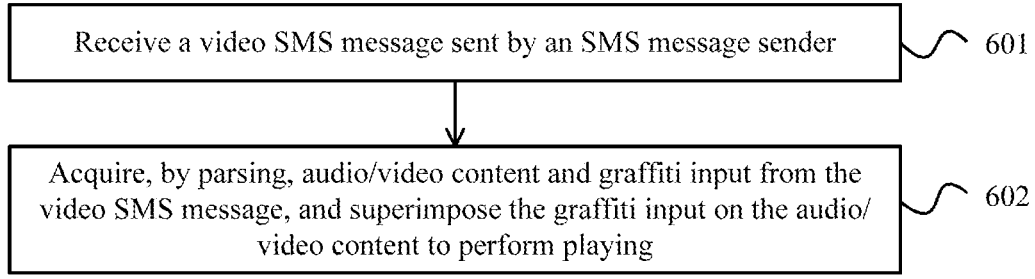
FIG. 6 is a flowchart of a video SMS message receiving method according to Embodiment 5 of the present invention.

FIG. 6 is a flowchart of a video SMS message receiving method according to Embodiment 5 of the present invention. As shown in FIG. 6, the embodiment may be applied to a video SMS message where a handheld electronic device plays and adds graffiti input, to emphasize a highlight that is in a video and that a user intends to share. The method may be executed by a video SMS message receiving apparatus. The apparatus may be implemented form of hardware and/or software, and may be integrated in a handheld electronic device. The handheld electronic device may be any terminal device such as a mobile phone and a tablet computer. The method specifically includes the following steps.

Step 601: Receive a video SMS message sent by an SMS message sender.

Specifically, the video SMS message is a video SMS message where graffiti input is added to audio/video content of a current frame.

Step 602: Acquire, by parsing, audio/video content and graffiti input from the video SMS message, and superimpose the graffiti input on the audio/video content to perform playing.

Specifically, the audio/video content is audio/video content collected by using two audio/video collecting devices: a camera and a microphone that are in a handheld electronic device. The graffiti input is touch track input and/or additional picture information that are/is collected by using a touchscreen of the handheld electronic device.

According to the embodiment, in a video SMS message playing process, a large quantity of words used to express content are changed into a graffiti manner, optimizing a video SMS message display effect, and also improving user experience and increasing fun of video shooting.

Embodiment 6

Figure 7:
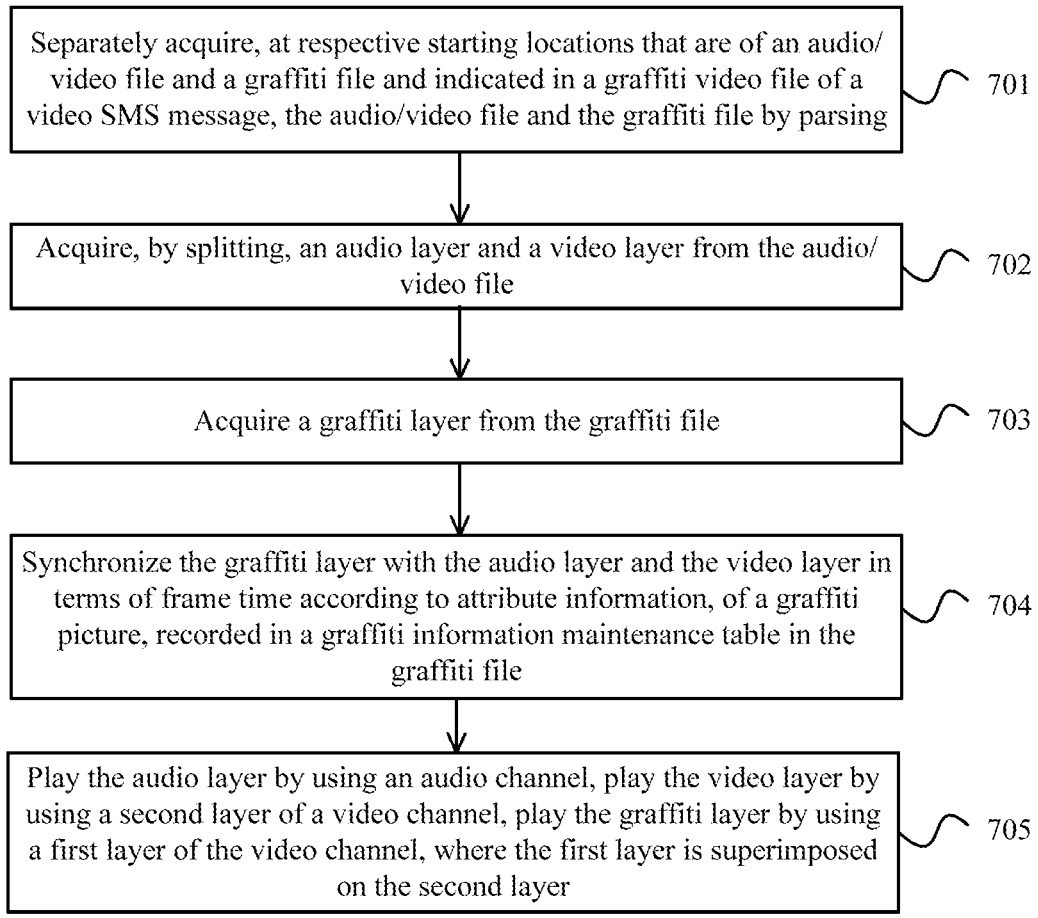
FIG. 7 is a flowchart of a video SMS message receiving method according to Embodiment 6 of the present invention.

FIG. 7 is a flowchart of a video SMS message receiving method according to Embodiment 6 of the present invention. Based on the foregoing embodiment, the embodiment further optimizes the operation of acquiring, by parsing, audio/video content and graffiti input from the video SMS message, and superimposing the graffiti input on the audio/video content to perform playing. As shown in FIG. 7, the acquiring, by parsing, audio/video content and graffiti input from the video SMS message, and superimposing the graffiti input on the audio/video content to perform playing may include the following steps.

Step 701: Separately acquire, at respective starting locations that are of an audio/video file and a graffiti file and indicated in a graffiti video file of the video SMS message, the audio/video file and the graffiti file by parsing.

Specifically, the audio/video file and the graffiti file that are in the graffiti video file are simply joined end to end. In addition, the graffiti video file includes a file header that records the starting locations of the two files after the superimposition, so as to facilitate separation of the two files when file parsing is performed.

Step 702: Acquire, by splitting, an audio layer and a video layer from the audio/video file.

Specifically, the audio layer may be sound data collected by using a microphone, and the video layer may be video data collected by using a camera.

Step 703: Acquire a graffiti layer from the graffiti file.

Specifically, the graffiti layer may be a graffiti picture formed by image information, such as touch track input, an additional picture, or a transparent background picture, collected by using a touchscreen.

Step 704: Synchronize the graffiti layer with the audio layer and the video layer in terms of frame time according to attribute information, of a graffiti picture, recorded in a graffiti information maintenance table in the graffiti file.

Specifically, in the graffiti information maintenance table, there is mainly attribute information of a graffiti picture of each frame, such as a size, a time point, an encoding format, and duration. The graffiti layer is synchronized with the audio layer and the video layer in terms of frame time according to the time point and the duration that are of the graffiti picture.

Step 705: Play the audio layer by using an audio channel, play the video layer by using a second layer of a video channel, play the graffiti layer by using a first layer of the video channel, where the first layer is superimposed on the second layer.

Specifically, because a graffiti file at the graffiti layer stores a graffiti picture that is after combining graffiti input, for example, information such as a transparent background picture, touch track input, and an additional picture, playing of the graffiti layer is the same as playing of the video layer, that is, the graffiti layer can be directly sent to the video channel to be displayed. In addition, because the graffiti input is added to video content of a current frame, the graffiti layer is superimposed on the video layer to be played.

In the embodiment of the present invention, a graffiti picture of each frame is synchronously combined with audio/video content of the current frame, which can reduce frame synchronization time. Attribute information of a graffiti picture of a current frame is recorded in a graffiti information maintenance table of a graffiti file, so as to facilitate parsing. In addition, according to the technical solution, an independent audio/video file and an independent graffiti file may be acquired by parsing, and a user may perform, based on a graffiti video, a second modification or a second graffiti making, so that the user can edit the graffiti video any time.

Embodiment 7

Figure 8:
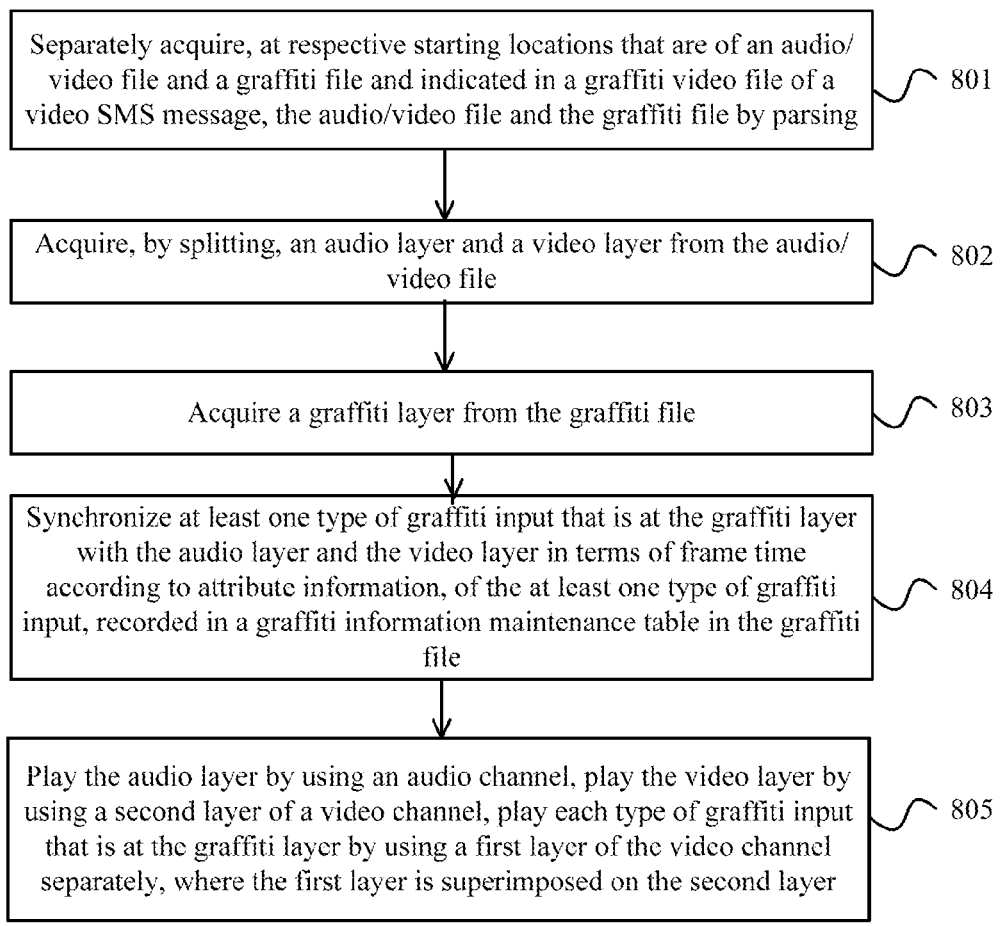
FIG. 8 is a flowchart of a video SMS message receiving method according to Embodiment 7 of the present invention.

FIG. 8 is a flowchart of a video SMS message receiving method according to Embodiment 7 of the present invention. As shown in FIG. 8, based on the foregoing embodiment, according to the embodiment of the present invention, the acquiring, by parsing, audio/video content and graffiti input from the video SMS message, and superimposing the graffiti input on the audio/video content to perform playing may be further optimized as follows.

Step 801: Separately acquire, at respective starting locations that are of an audio/video file and a graffiti file and indicated in a graffiti video file of the video SMS message, the audio/video file and the graffiti file by parsing.

Step 802: Acquire, by splitting, an audio layer and a video layer from the audio/video file.

Step 803: Acquire a graffiti layer from the graffiti file.

Specifically, the graffiti layer may be touch track input and/or an additional picture that are/is collected by using a touchscreen.

Step 804: Synchronize the at least one type of graffiti input that is at the graffiti layer with the audio layer and the video layer in terms of frame time according to attribute information, of the at least one type of graffiti input, recorded in a graffiti information maintenance table in the graffiti file.

Specifically, the at least one type of graffiti input includes at least: touch track input and an additional picture. Attribute information of the touch track input may be a coordinate, a line width, color, a time point, duration and the like that are of a touch track. Attribute information of the additional picture may be a size, a time point, duration and the like that are of the picture. The touch track input and the additional picture may be synchronized with the audio layer and the video layer in terms of frame time according to a time point and duration that are corresponding to the touch track input and the additional picture.

Step 805: Play the audio layer by using an audio channel, play the video layer by using a second layer of a video channel, play the at least one type of graffiti input that is at the graffiti layer by using a first layer of the video channel separately, where the first layer is superimposed on the second layer.

Specifically, because the graffiti file at the graffiti layer stores the at least one type of graffiti input, for example, information such as the touch track input and the additional picture, playing of the graffiti layer and playing of the video layer are classified into at least two cases: if it is the additional picture, the additional picture can be directly sent to the first layer of the video channel to be displayed; if it is the touch track input, the touch track input is drawn at the first layer of the video channel according to information, such as the coordinate, the line width, and the color, of the touch track. In addition, because the graffiti input is added to video content of a current frame, the graffiti layer is superimposed on the video layer to be played.

According to the embodiment of the present invention, attribute information of the at least one type of graffiti input is separately recorded in a graffiti information maintenance table, the at least one type of graffiti input that is independent may be acquired by parsing, so that a user can edit a graffiti video any time. In addition, when the user separately performs a second operation on the at least one type of graffiti input in the graffiti video, for example, modification or graffiti remaking, it only needs to separately update, based on an original graffiti video, the at least one type of graffiti input correspondingly, and it no longer needs to combine the at least one type of graffiti input into a graffiti picture of a current frame to replace an original graffiti picture, so that the second operation is more convenient and faster.

Embodiment 8

Figure 9:
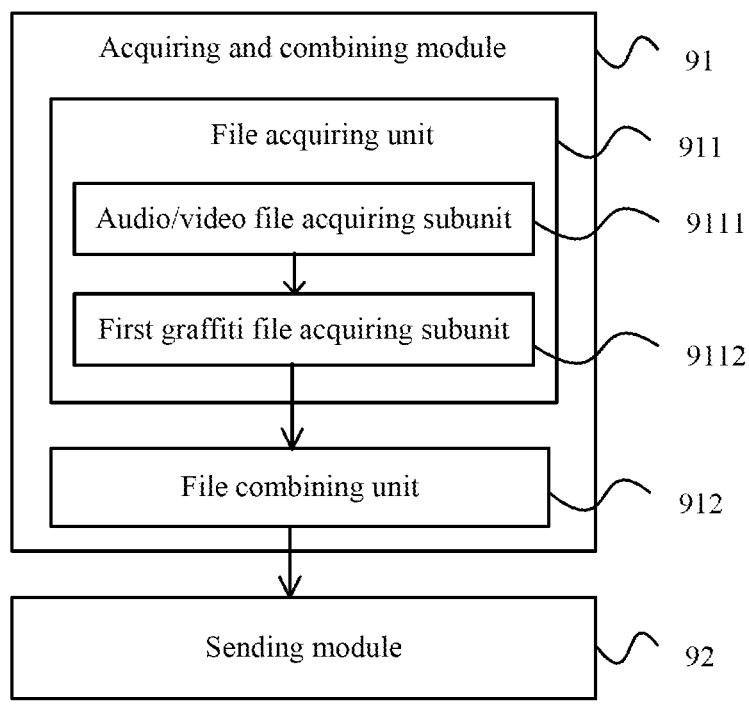
FIG. 9 is a schematic structural diagram of a video SMS message sending apparatus according to Embodiment 8 of the present invention.

FIG. 9 is a schematic structural diagram of a video SMS message sending apparatus according to Embodiment 8 of the present invention. The apparatus of the embodiment may be used to execute a technical solution of a video SMS message sending method provided by an embodiment of the present invention. The apparatus of the embodiment specifically includes: an acquiring and combining module 91 and a sending module 92. The acquiring and combining module 91 is configured to acquire audio/video content, synchronously acquire graffiti input corresponding to the audio/video content, and combine the audio/video content and the graffiti input into a graffiti video file. The sending module 92 is configured to send the graffiti video file as a video SMS message to an SMS message receiver.

The apparatus of the embodiment may be used to execute a technical solution of a video SMS message sending method embodiment provided by an embodiment of the present invention. Implementation principles and technical effects thereof are similar, and are not described herein again.

Based on the foregoing descriptions, the acquiring and combining module 91 preferably includes: a file acquiring unit 911 and a file combining unit 912. The file acquiring unit 911 is configured to acquire the audio/video content to form an audio/video file, and synchronously acquire the graffiti input corresponding to the audio/video content to form a graffiti file. The file combining unit 912 is configured to separately store the audio/video file and the graffiti file in the graffiti video file, and record respective starting locations of the audio/video file and the graffiti file.

Based on the foregoing descriptions, the file acquiring unit 911 preferably includes an audio/video file acquiring subunit 9111, configured to acquire audio/video content of a current frame, and record the audio/video content in the audio/video file. A first graffiti file acquiring subunit 9112 is configured to: while the audio/video content of the current frame is being acquired, collect, at a transparent background layer, at least one type of graffiti input, combine the at least one type of graffiti input into a graffiti picture of the current frame, record the graffiti picture of the current frame in the graffiti file, and record attribute information of the graffiti picture of the current frame in a graffiti information maintenance table.

Operations of the audio/video file acquiring subunit 9111 and the first graffiti file acquiring subunit 9112 are repeatedly executed to process each frame, until it is determined that recording of the audio/video content ends.

Specifically, the attribute information of the graffiti picture of the current frame includes at least: a size of the graffiti picture of the current frame, a time point and an encoding format that are of the current frame, and duration of the current frame. The at least one type of graffiti input includes at least: touch track input and an additional picture, and may further include a transparent background picture and the like. Attribute information of the touch track input includes: a coordinate, a line width, color, a time point, and duration that are of a touch track.

Embodiment 9

Figure 10:
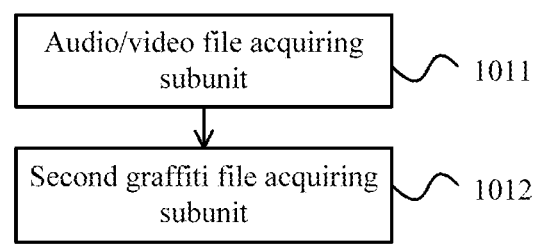
FIG. 10 is a schematic structural diagram of a video SMS message sending apparatus according to Embodiment 9 of the present invention.

Based on the foregoing descriptions, as shown in FIG. 10, a file acquiring unit 101 may include: an audio/video file acquiring subunit 1011 and a second graffiti file acquiring subunit 1012. The audio/video file acquiring subunit 1011 is configured to acquire audio/video content of a current frame, and record the audio/video content in an audio/video file. The second graffiti file acquiring subunit 1012 is configured to: while the audio/video content of the current frame is being acquired, collect, at a transparent background layer, at least one type of graffiti input, separately record the at least one type of graffiti input in a graffiti file, and separately record attribute information of the at least one type of graffiti input in a graffiti information maintenance table. Operations of the audio/video file acquiring subunit 1011 and the second graffiti file acquiring subunit 1012 are repeatedly executed to process each frame, until it is determined that recording of the audio/video content ends. The at least one type of graffiti input includes at least: touch track input and an additional picture. Attribute information of the touch track input includes: a coordinate, a line width, color, a time point, and duration that are of a touch track.

The apparatus of the embodiment may be used to execute a technical solution of a video SMS message sending method embodiment provided by an embodiment of the present invention. Implementation principles and technical effects thereof are similar, and are not described herein again.

Embodiment 10

Figure 11:
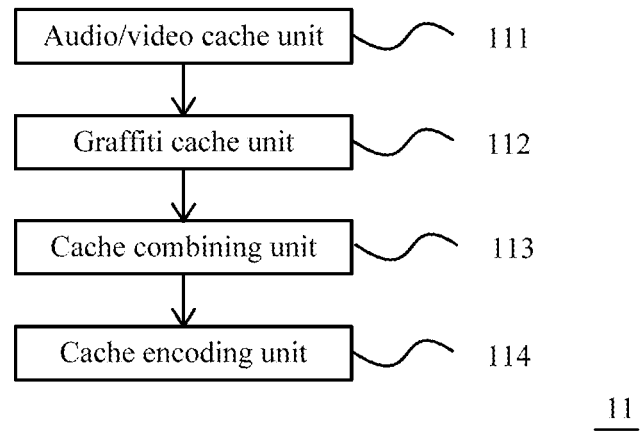
FIG. 11 is a schematic structural diagram of a video SMS message sending apparatus according to Embodiment 10 of the present invention.

Referring to FIG. 11, based on the foregoing embodiment, an acquiring and combining module 11 may include: an audio/video cache unit 111, a graffiti cache unit 112, a cache combining unit 113, and a cache encoding unit 114. The audio/video cache unit 111 is configured to acquire audio/video content of a current frame, and store the audio/video content in an audio/video frame cache. The graffiti cache unit 112 is configured to: while the audio/video content of the current frame is being acquired, collect, at a transparent background layer, at least one type of graffiti input, and separately store the at least one type of graffiti input in the at least one type of graffiti frame cache. The cache combining unit 113 is configured to combine data that is in the audio/video frame cache and the at least one type of graffiti frame cache and that is of the current frame, and store combined data in a combined-frame cache. The cache encoding unit 114 is configured to encode data that is in the combined-frame cache to from an audio/video of the current frame, and record the audio/video in a graffiti video file. Operations of the audio/video cache unit 111, the graffiti cache unit 112, the cache combining unit 113, and the cache encoding unit 114 are repeatedly executed to process each frame, until it is determined that recording of the audio/video content ends. The at least one type of graffiti input includes at least: touch track input and an additional picture.

The apparatus of the embodiment may be used to execute a technical solution of a video SMS message sending method embodiment provided by an embodiment of the present invention. Implementation principles and technical effects thereof are similar, and are not described herein again.

Embodiment 11

Figure 12:
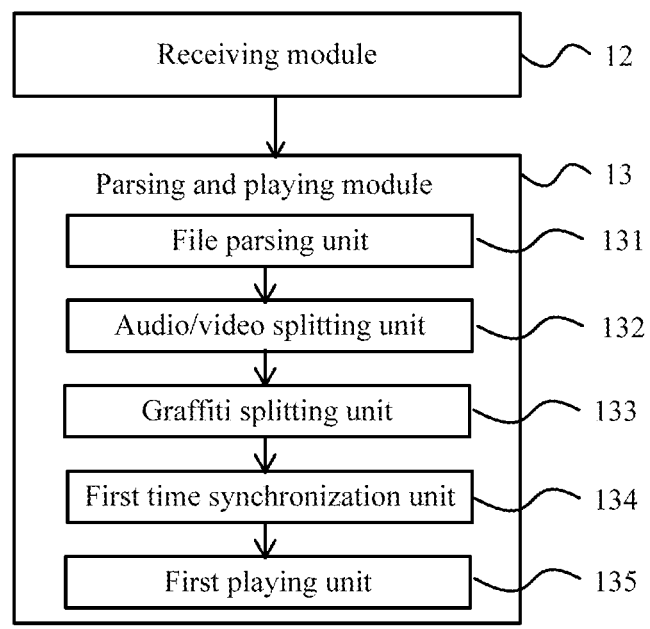
FIG. 12 is a schematic structural diagram of a video SMS message receiving apparatus according to Embodiment 11 of the present invention.

FIG. 12 is a schematic structural diagram of a video SMS message receiving apparatus according to Embodiment 11 of the present invention. The apparatus of the embodiment may be used to execute a technical solution of a video SMS message receiving method provided by Embodiment 5 of the present invention. The apparatus of the embodiment specifically includes: a receiving module 12 and a parsing and playing module 13. The receiving module 12 is configured to receive a video SMS message sent by an SMS message sender. The parsing and playing module 13 is configured to acquire, by parsing, audio/video content and graffiti input from the video SMS message, and superimpose the graffiti input on the audio/video content to perform playing.

The apparatus of the embodiment may be used to execute a technical solution of a video SMS message receiving method embodiment provided by an embodiment of the present invention. Implementation principles and technical effects thereof are similar, and are not described herein again.

Based on the foregoing descriptions, the parsing and playing module 13 preferably includes: a file parsing unit 131, an audio/video splitting unit 132, a graffiti splitting unit 133, a first time synchronization unit 134, and a first playing unit 135. The file parsing unit 131 is configured to separately acquire, at respective starting locations that are of an audio/video file and a graffiti file and indicated in a graffiti video file of the video SMS message, the audio/video file and the graffiti file by parsing. The audio/video splitting unit 132 is configured to acquire, by splitting, an audio layer and a video layer from the audio/video file. The graffiti splitting unit 133 is configured to acquire a graffiti layer from the graffiti file. The first time synchronization unit 134 is configured to synchronize the graffiti layer with the audio layer and the video layer in terms of frame time according to attribute information, of a graffiti picture, recorded in a graffiti information maintenance table in the graffiti file. The first playing unit 135 is configured to play the audio layer by using an audio channel, play the video layer by using a second layer of a video channel, and play the graffiti layer by using a first layer of the video channel, where the first layer is superimposed on the second layer. The at least one type of graffiti input includes at least: touch track input and an additional picture.

Embodiment 12

Figure 13:
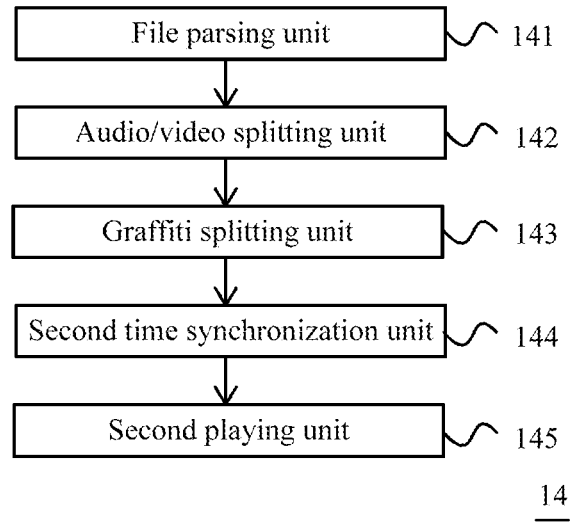
FIG. 13 is a schematic structural diagram of a video SMS message receiving apparatus according to Embodiment 12 of the present invention.

Based on the foregoing descriptions, as shown in FIG. 13, a parsing and playing module 14 may further preferably include: a file parsing unit 141, an audio/video splitting unit 142, a graffiti splitting unit 143, a second time synchronization unit 144, and a second playing unit 145. The file parsing unit 141 is configured to separately acquire, at respective starting locations that are of an audio/video file and a graffiti file and indicated in a graffiti video file of the video SMS message, the audio/video file and the graffiti file by parsing. The audio/video splitting unit 142 is configured to acquire, by splitting, an audio layer and a video layer from the audio/video file. The graffiti splitting unit 143 is configured to acquire a graffiti layer from the graffiti file. The second time synchronization unit 144 is configured to synchronize the at least one type of graffiti input that is at the graffiti layer with the audio layer and the video layer in terms of frame time according to attribute information, of the at least one type of graffiti input, recorded in a graffiti information maintenance table in the graffiti file. The second playing unit 145 is configured to play the audio layer by using an audio channel, play the video layer by using a second layer of a video channel, and play the at least one type of graffiti input that is at the graffiti layer by using a first layer of the video channel separately, where the first layer is superimposed on the second layer. The at least one type of graffiti input includes at least: touch track input and an additional picture.

Embodiment 13

Figure 14:
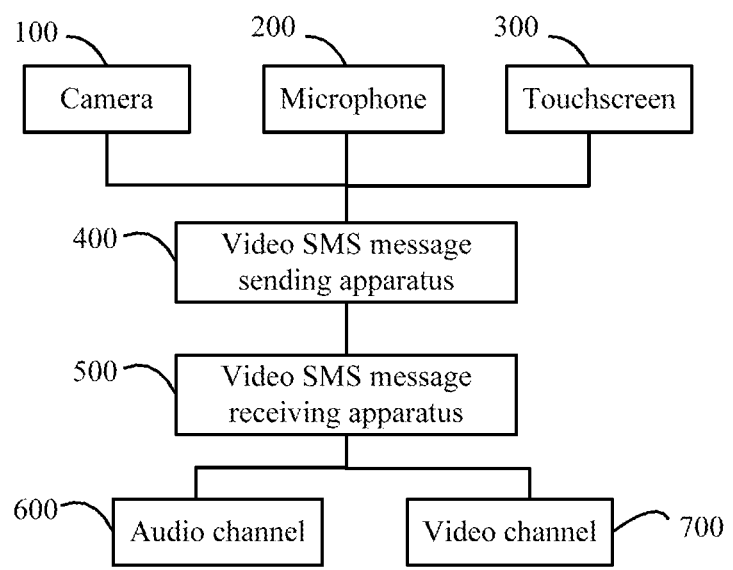
FIG. 14 is a schematic structural diagram of a handheld electronic device according to Embodiment 13 of the present invention.

FIG. 14 is a schematic structural diagram of a handheld electronic device according to Embodiment 13 of the present invention. The handheld electronic device provided by the embodiment of the present invention includes a memory, a camera 100, a microphone 200, a touchscreen 300, a video SMS message sending apparatus 400 provided by any embodiment of the present invention, a video SMS message receiving apparatus 500 provided by any embodiment of the present invention, an audio channel 600, and a video channel 700. The camera 100 is configured to collect video content. The microphone 200 is configured to collect audio content. The touchscreen 300 is configured to receive an input operation of a user. The audio channel 600 is configured to play the audio content. The video channel 700 is configured to play the video content and graffiti input.

The handheld electronic device may implement all functions of the foregoing embodiments. Implementation principles and beneficial effects thereof are similar, and are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A video SMS message sending method comprising:
   acquiring audio/video content, synchronously acquiring graffiti input corresponding to the audio/video content comprising audio and video, and combining the audio/video content and the graffiti input into a graffiti video file, wherein acquiring audio/video content, synchronously acquiring graffiti input corresponding to the audio/video content, and combining the audio/video content and the graffiti input into a graffiti video file comprises collecting at least one type of graffiti input at a transparent background layer and storing an attribute information relating to the graffiti input; and
   sending the graffiti video file as a video SMS message to an SMS message receiver.

2. The method according to claim 1, wherein the acquiring audio/video content, synchronously acquiring graffiti input corresponding to the audio/video content, and combining the audio/video content and the graffiti input into a graffiti video file comprises:
   acquiring the audio/video content to form an audio/video file, and synchronously acquiring the graffiti input corresponding to the audio/video content to form a graffiti file; and
   separately storing the audio/video file and the graffiti file in the graffiti video file, and recording respective starting locations of the audio/video file and the graffiti file.

3. The method according to claim 2, wherein the acquiring the audio/video content to form an audio/video file, and synchronously acquiring the graffiti input corresponding to the audio/video content to form a graffiti file comprises:
   acquiring audio/video content of a current frame, and recording the audio/video content in the audio/video file;
   while acquiring the audio/video content of the current frame, combining the at least one type of graffiti input into a graffiti picture of the current frame, recording the graffiti picture of the current frame in the graffiti file, and wherein storing the attribute information comprises recording the attribute information of the graffiti picture of the current frame in a graffiti information maintenance table; and
   repeatedly executing the foregoing steps of acquiring, recording, collecting, combining, recording, and recording to process each frame, until it is determined that recording of the audio/video content ends.

4. The method according to claim 3, wherein the attribute information of the graffiti picture of the current frame comprises at least: a size of the graffiti picture of the current frame, a time point and an encoding format that are of the current frame, and duration of the current frame.

5. The method according to claim 3, wherein the at least one type of graffiti input comprises at least: touch track input and an additional picture.

6. The method according to claim 2, wherein the acquiring the audio/video content to form an audio/video file, and synchronously acquiring the graffiti input corresponding to the audio/video content to form a graffiti file comprises:
   acquiring audio/video content of a current frame, and recording the audio/video content in the audio/video file;
   while acquiring the audio/video content of the current frame, separately recording the at least one type of graffiti input in the graffiti file, and wherein storing the attribute information comprises separately recording the attribute information of the at least one type of graffiti input in a graffiti information maintenance table; and
   repeatedly executing the foregoing steps of acquiring, recording, collecting, combining, recording, and recording to process each frame, until it is determined that recording of the audio/video content ends.

7. A video SMS message receiving method comprising:
   receiving a video SMS message sent by an SMS message sender;
   acquiring, by parsing, audio/video content comprising audio and video and graffiti input from the video SMS message, wherein the acquiring comprises acquiring an audio/video file and a graffiti file from the video SMS message; and
   superimposing the graffiti input on the audio/video content to perform playing, wherein superimposing the graffiti input on the audio/video content comprises synchronizing a graffiti content in the graffiti file with the audio and video from the audio/video file according to an attribute information of the graffiti content in the graffiti file.

8. The method according to claim 7, wherein the acquiring, by parsing, audio/video content and graffiti input from the video SMS message, and superimposing the graffiti input on the audio/video content to perform playing comprises:
   separately acquiring, at respective starting locations that are of an audio/video file and a graffiti file and indicated in a graffiti video file of the video SMS message, the audio/video file and the graffiti file by parsing;
   acquiring, by splitting, an audio layer and a video layer from the audio/video file;
   acquiring a graffiti layer from the graffiti file;
   synchronizing the graffiti layer with the audio layer and the video layer in terms of frame time according to attribute information, of a graffiti picture, recorded in a graffiti information maintenance table in the graffiti file; and
   playing the audio layer by using an audio channel, playing the video layer by using a second layer of a video channel, playing the graffiti layer by using a first layer of the video channel, wherein the first layer is superimposed on the second layer.

9. The method according to claim 7, wherein the acquiring, by parsing, audio/video content and graffiti input from the video SMS message, and superimposing the graffiti input on the audio/video content to perform playing comprises:
   separately acquiring, at respective starting locations that are of an audio/video file and a graffiti file and indicated in a graffiti video file of the video SMS message, the audio/video file and the graffiti file by parsing;

acquiring, by splitting, an audio layer and a video layer from the audio/video file;

acquiring a graffiti layer from the graffiti file;

synchronizing the at least one type of graffiti input that is at the graffiti layer with the audio layer and the video layer in terms of frame time according to attribute information, of the at least one type of graffiti input, recorded in a graffiti information maintenance table in the graffiti file; and playing the audio layer by using an audio channel, playing the video layer by using a second layer of a video channel, playing the at least one type of graffiti input that is at the graffiti layer by using a first layer of the video channel separately, wherein the first layer is superimposed on the second layer.

10. The method according to claim 9, wherein the at least one type of graffiti input comprises at least: touch track input and an additional picture.

11. A video SMS message sending apparatus comprising a processor and a non-transitory computer-readable medium storing program modules executable by the processor, the program modules including:

an acquiring and combining module configured to acquire audio/video content comprising audio and video, synchronously acquire graffiti input corresponding to the audio/video content, and combine the audio/video content and the graffiti input into a graffiti video file, wherein the acquiring and combining module is configured to collect at least one type of graffiti input at a transparent background layer and store an attribute information relating to the graffiti input; and a sending module configured to send the graffiti video file as a video SMS message to an SMS message receiver.

12. The apparatus according to claim 11, wherein the acquiring and combining module comprises:

a file acquiring unit configured to acquire the audio/video content to form an audio/video file, and synchronously acquire the graffiti input corresponding to the audio/video content to form a graffiti file; and a file combining unit configured to separately store the audio/video file and the graffiti file in the graffiti video file, and record respective starting locations of the audio/video file and the graffiti file.

13. The apparatus according to claim 12, wherein the file acquiring unit comprises:

an audio/video file acquiring subunit configured to acquire audio/video content of a current frame, and record the audio/video content in the audio/video file; and a first graffiti file acquiring subunit configured to: while the audio/video content of the current frame is being acquired, collect, at a transparent background layer, at least one type of graffiti input, combine the at least one type of graffiti input into a graffiti picture of the current frame, record the graffiti picture of the current frame in the graffiti file, and record attribute information of the graffiti picture of the current frame in a graffiti information maintenance table, wherein operations of the audio/video file acquiring subunit and the first graffiti file acquiring subunit are repeatedly executed to process each frame, until it is determined that recording of the audio/video content ends.

14. The apparatus according to claim 13, wherein the attribute information of the graffiti picture of the current frame comprises at least: a size of the graffiti picture of the current frame, a time point and an encoding format that are of the current frame, and duration of the current frame.

15. The apparatus according to claim 13, wherein the at least one type of graffiti input comprises at least: touch track input and an additional picture.

16. The apparatus according to claim 12, wherein the file acquiring unit comprises:

an audio/video file acquiring subunit configured to acquire audio/video content of a current frame, and record the audio/video content in the audio/video file; and a second graffiti file acquiring subunit configured to:
while the audio/video content of the current frame is being acquired, collect, at a transparent background layer, at least one type of graffiti input, separately record the at least one type of graffiti input in the graffiti file, and separately record attribute information of the at least one type of graffiti input in a graffiti information maintenance table, wherein operations of the audio/video file acquiring subunit and the second graffiti file acquiring subunit are repeatedly executed to process each frame until it is determined that recording of the audio/video content ends.

17. A video SMS message receiving apparatus comprising a processor and a non-transitory computer-readable medium storing program modules executable by the processor, the modules including:

a receiving module configured to receive a video SMS message sent by an SMS message sender; and a parsing and playing module configured to acquire, by parsing, audio/video content comprising audio and video and graffiti input from the video SMS message, and superimpose the graffiti input on the audio/video content to perform playing, wherein the parsing and playing module configured to acquire by acquiring an audio/video file and a graffiti file from the video SMS message, and wherein the parsing and playing module configured to superimpose by synchronizing a graffiti content in the graffiti file with the audio and video from the audio/video file according to an attribute information of the graffiti content in the graffiti file.

18. The apparatus according to claim 17, wherein the parsing and playing module comprises:

a file parsing unit configured to separately acquire, at respective starting locations that are of an audio/video file and a graffiti file and indicated in a graffiti video file of the video SMS message, the audio/video file and the graffiti file by parsing;

an audio/video splitting unit configured to acquire, by splitting, an audio layer and a video layer from the audio/video file;

a graffiti splitting unit configured to acquire a graffiti layer from the graffiti file;

a first time synchronization unit configured to synchronize the graffiti layer with the audio layer and the video layer in terms of frame time according to attribute information, of a graffiti picture, recorded in a graffiti information maintenance table in the graffiti file; and a first playing unit configured to play the audio layer by using an audio channel, play the video layer by using a second layer of a video channel, and play the graffiti layer by using a first layer of the video channel, wherein the first layer is superimposed on the second layer.

19. The apparatus according to claim 17, wherein the parsing and playing module comprises:
- a file parsing unit configured to separately acquire, at respective starting locations that are of an audio/video file and a graffiti file and indicated in a graffiti video file of the video SMS message, the audio/video file and the graffiti file by parsing;
- an audio/video splitting unit configured to acquire, by splitting, an audio layer and a video layer from the audio/video file;
- a graffiti splitting unit configured to acquire a graffiti layer from the graffiti file;
- a second time synchronization unit configured to synchronize the at least one type of graffiti input that is at the graffiti layer with the audio layer and the video layer in terms of frame time according to attribute information, of the at least one type of graffiti input, recorded in a graffiti information maintenance table in the graffiti file; and
- a second playing unit configured to play the audio layer by using an audio channel, play the video layer by using a second layer of a video channel, and play the at least one type of graffiti input that is at the graffiti layer by using a first layer of the video channel separately, wherein the first layer is superimposed on the second layer.

20. The apparatus according to claim 19, wherein the at least one type of graffiti input comprises at least: touch track input and an additional picture.

21. A handheld electronic device comprising a processor and a memory, and further comprising:
- a video SMS message sending apparatus comprising first program modules executable by the processor, the first program modules comprising:
  - an acquiring and combining module configured to acquire audio/video content comprising audio and video, synchronously acquire graffiti input corresponding to the audio/video content, and combine the audio/video content and the graffiti input into a graffiti video file, wherein acquiring audio/video content, synchronously acquiring graffiti input corresponding to the audio/video content, and combining the audio/video content and the graffiti input into a graffiti video file comprises collecting at least one type of graffiti input at a transparent background layer and storing an attribute information relating to the graffiti input;
  - a sending module configured to send the graffiti video file as a video SMS message to an SMS message receiver;
- a video SMS message receiving apparatus comprising second program modules executable by the processor, the second program modules comprising:
  - a receiving module configured to receive a video SMS message sent by an SMS message sender; and
  - a parsing and playing module configured to acquire, by parsing, audio/video content and graffiti input from the video SMS message, and superimpose the graffiti input on the audio/video content to perform playing;
- a camera configured to collect video content;
- a microphone configured to collect audio content;
- a touchscreen configured to receive an input operation of a user;
- an audio channel configured to play the audio content; and
- a video channel configured to play the video content and graffiti input.

* * * * *